(12) United States Patent
Kikin

(10) Patent No.: US 9,361,493 B2
(45) Date of Patent: Jun. 7, 2016

(54) CHAIN ANTENNA SYSTEM

(71) Applicant: Applied Wireless Identifications Group, Inc., Morgan Hill, CA (US)

(72) Inventor: Vadim Kikin, Spring Valley, NY (US)

(73) Assignee: Applied Wireless Identifications Group, Inc., Morgan Hill, CA (US)

( * ) Notice: Subject to any disclaimer, the term of this patent is extended or adjusted under 35 U.S.C. 154(b) by 122 days.

(21) Appl. No.: 14/198,453

(22) Filed: Mar. 5, 2014

(65) Prior Publication Data

US 2014/0253408 A1    Sep. 11, 2014

Related U.S. Application Data

(60) Provisional application No. 61/774,457, filed on Mar. 7, 2013.

(51) Int. Cl.
| | |
|---|---|
| *G06K 7/10* | (2006.01) |
| *H01Q 21/06* | (2006.01) |
| *H01Q 21/00* | (2006.01) |

(52) U.S. Cl.
CPC ........ *G06K 7/10356* (2013.01); *H01Q 21/0006* (2013.01); *H01Q 21/0075* (2013.01); *H01Q 21/065* (2013.01)

(58) Field of Classification Search
CPC ....... G06K 7/10316–7/10356; H01Q 21/0075; H01Q 21/08; H01Q 21/24
USPC .................................................. 343/700 MS
See application file for complete search history.

(56) References Cited

U.S. PATENT DOCUMENTS

| | | |
|---|---|---|
| 2,145,024 A | 1/1939 | Bruce |
| 3,484,724 A | 12/1969 | Podell |
| 3,611,400 A | 10/1971 | Nagai et al. |
| 3,757,342 A | 9/1973 | Jasik et al. |
| 3,803,615 A | 4/1974 | Goodbody |
| 3,806,946 A | 4/1974 | Tiuri et al. |
| 3,987,455 A | 10/1976 | Olyphant, Jr. |
| 3,995,277 A | 11/1976 | Olyphant, Jr. |
| 4,063,245 A | 12/1977 | James et al. |
| 4,072,951 A | 2/1978 | Kaloi |
| 4,180,817 A | 12/1979 | Sanford |
| 4,203,116 A | 5/1980 | Lewin |
| 4,213,133 A | 7/1980 | Hidaka |
| 4,291,312 A | 9/1981 | Kaloi |
| 4,430,645 A | 2/1984 | Eskandry et al. |
| 4,475,107 A | 10/1984 | Makimoto et al. |
| 4,521,781 A | 6/1985 | Campi et al. |
| 4,578,652 A | 3/1986 | Sterns |

(Continued)

OTHER PUBLICATIONS

Hum et al., "Efficiency of a Resistively Loaded Microstrip Patch Antenna," IEEE Antennas and Wireless Propagation Letters, vol. 2, 2003, p. 22-25.

(Continued)

*Primary Examiner* — Howard Williams
(74) *Attorney, Agent, or Firm* — Zilka-Kotab, PC

(57) ABSTRACT

A Radio Frequency Identification (RFID) system according to one embodiment includes a chain of radiating elements; a transmission line; and power dividers coupled along the transmission line, the power dividers coupling the transmission line to each of the radiating elements, the power dividers being configured such that each radiating element receives about a same amount of power from the transmission line.

25 Claims, 17 Drawing Sheets

(56) References Cited

U.S. PATENT DOCUMENTS

| | | |
|---|---|---|
| 4,580,141 A | 4/1986 | Gutleber |
| 4,833,482 A | 5/1989 | Trinh et al. |
| 4,851,795 A | 7/1989 | Beckwith |
| 4,899,163 A | 2/1990 | Daniel et al. |
| 4,914,445 A | 4/1990 | Shoemaker |
| 5,012,256 A | 4/1991 | Maddocks |
| 5,210,541 A | 5/1993 | Hall et al. |
| 5,216,430 A | 6/1993 | Rahm et al. |
| 5,422,649 A | 6/1995 | Huang |
| 5,446,447 A | 8/1995 | Carney et al. |
| 5,594,455 A | 1/1997 | Hori et al. |
| 5,608,417 A | 3/1997 | de Vall |
| 5,610,384 A | 3/1997 | Goto |
| 5,675,343 A | 10/1997 | Champeau |
| 5,771,021 A | 6/1998 | Veghte et al. |
| 5,878,327 A | 3/1999 | Hayashi et al. |
| 6,424,298 B1 | 7/2002 | Nishikawa et al. |
| 6,480,163 B1 | 11/2002 | Knop et al. |
| 6,842,158 B2 | 1/2005 | Jo et al. |
| 7,009,564 B2 | 3/2006 | Ryken et al. |
| 7,095,384 B2 | 8/2006 | Koreyasu et al. |
| 7,109,929 B1 | 9/2006 | Ryken, Jr. et al. |
| 7,310,070 B1 | 12/2007 | Hardman et al. |
| 7,319,398 B2 | 1/2008 | Marino |
| 7,518,554 B2 | 4/2009 | Bateman et al. |
| 7,525,487 B2 | 4/2009 | Burnside et al. |
| 7,554,491 B2 | 6/2009 | Burkholder et al. |
| 7,576,696 B2 * | 8/2009 | Walton ............ H01Q 9/40 343/700 MS |
| D617,318 S | 6/2010 | Tsai |
| 7,733,280 B2 | 6/2010 | Cornwell |
| 8,058,998 B2 | 11/2011 | Burnside et al. |
| 8,078,215 B2 | 12/2011 | Becker |
| 8,193,990 B2 | 6/2012 | Nakabayashi et al. |
| 8,289,163 B2 | 10/2012 | Erickson et al. |
| 8,604,981 B2 * | 12/2013 | Ehlen ............ H01Q 21/0087 343/700 MS |
| 2006/0238307 A1 | 10/2006 | Bauer et al. |
| 2007/0004363 A1 | 1/2007 | Kusaka et al. |
| 2007/0206705 A1 | 9/2007 | Stewart |
| 2007/0273528 A1 | 11/2007 | Burkholder et al. |
| 2007/0273529 A1 | 11/2007 | Lee et al. |
| 2007/0279303 A1 * | 12/2007 | Schoebel ........ H01Q 21/0075 343/713 |
| 2008/0284654 A1 | 11/2008 | Burnside et al. |

OTHER PUBLICATIONS

Hong, "Gain-Enhanced Broadband Microstrip Antenna," Proc. Natl. Sci. Counc. ROC(A), vol. 23, No. 5, 1999, pp. 609-611.

Chen, "Compact circular microstrip antenna with embedded chip resistor and capacitor," Antennas and Propagation Society International Symposium, 1998, IEEE (vol. 3), pp. 1356-1359.

Chang et al., "Microwave Ring Circuit and Related Structures," John Wiley & Sons 2004, pp. 197-240.

Fusco et al., "Lumped Element Hybrid Networks for GaAs MMICs," Microwave Optical Tech. Lett., vol. 2, Jan. 1989, pp. 19-23.

Parisi, "180 degrees lumped element hybrid," Microwave Symposium Digest, 1989 IEEE MTT-S International, vol. 3, pp. 1243-1246.

Parisi, "A Lumped Element Rat Race Coupler," Applied Microwave, Aug./Sep. 1989, pp. 85-93.

Stewart, R.G., U.S. Appl. No. 11/367,061, filed Mar. 3, 2006.

* cited by examiner

CHAIN ANTENNA SYSTEM

RELATED APPLICATIONS

This application claims priority from U.S. Provisional Patent Application No. 61/774,457 filed on Mar. 7, 2013, which is herein incorporated by reference.

FIELD OF THE INVENTION

The present invention relates to Radio Frequency (RF) communication systems, and more particularly, this invention relates to a chain antenna system for use in Radio Frequency (RF) and Radio Frequency Identifications (RFID) systems.

BACKGROUND

RFID systems include different arrangements of antennas, which may transmit an RF carrier wave as well as receive backscattered radio waves through their antennas. Some conventional products implement one dimensional antenna arrays (linear antenna arrays) to achieve transmittal of a narrow, directional transmissions, e.g., for far field applications. However, to achieve such directional functionality, in addition to reducing parasitic side and back radiation, conventional products sacrifice uniformity and ultimately create an uneven distribution of energy short distances from radiating elements, e.g., less than one wavelength of the radiated field and/or less than a linear dimension of the antenna array. This is particularly apparent for near and/or medium electromagnetic field applications. For instance, the field produced by RFID applications having conventional linear array antennas may have a difference of about 20-30 dB between opposite sides thereof. For examples of such conventional disadvantages, see any of the following U.S. Pat. No. 3,806,946 entitled "Travelling wave chain antenna", U.S. Pat. No. 4,180,817 entitled "Serially connected microstrip antenna array", U.S. Pat. No. 4,521,781 entitled "Phase scanned microstrip array antenna", U.S. Pat. No. 5,422,649 entitled "Parallel and series FED microstrip array with high efficiency and low cross polarization", U.S. Pat. No. 6,424,298 entitled "Microstrip array antenna", U.S. Pat. No. 7,095,384 entitled "Array antenna", U.S. Pat. No. 7,109,929 entitled "TM microstrip antenna", U.S. Pat. No. 7,518,554 entitled "Antenna arrays and methods of making the same", U.S. Pat. No. 7,525,487 entitled "RFID Shelf Antennas", U.S. Pat. No. 7,554,491 entitled "Low Profile Distributed Antenna", U.S. Pat. No. 7,733,280 entitled "Antenna system", U.S. Pat. No. 8,058,998 entitled "Elongated twin feed line RFID antenna with distributed radiation perturbations", U.S. Pat. No. 8,078,215 entitled "Waveguide-based wireless distribution system and method of operation", U.S. Pat. No. 8,193,990 entitled "Microstrip array antenna", U.S. Pat. No. 8,289,163 entitled "Signal line structure for a radio-frequency identification system", and U.S. Pat. No. D617,318 entitled "RFID antenna."

In an attempt to overcome such disadvantages of conventional linear antenna arrays, other conventional products have implemented parallel configurations, which essentially combine multiple radiating elements of linear antenna arrays in parallel using power dividers or transmission lines transformers. Although this parallel design may improve the uneven distribution of energy found in the conventional linear antenna array, they introduce additional problems. Combining multiple radiating elements in a linear antenna array requires extensive cabling, thereby undesirably increasing power consumption, as well as the cost of fabrication and/or upkeep.

BRIEF SUMMARY

To overcome the foregoing disadvantages of conventional products, various embodiments described and/or suggested herein preferably include circuitry for a chain of radiating elements, e.g., which allow for the transmission of substantially uniform electromagnetic fields while also improving efficiency during operation thereof. It is particularly desirable that such improvements are achieved in the vicinity to radiating elements, e.g., for distances less than about one wave length, and/or within near and medium electromagnetic fields. It is also desirable that different embodiments described herein maintain a low voltage standing wave ratio (VSWR) at the feeding port of a chain antenna system over an operational frequency band and various surrounding conditions. Furthermore, by implementing a chain of radiating elements, many embodiments described below include only a single electrical coupling medium (e.g., cable) to enable operation thereof, as will be described in further detail below.

A Radio Frequency Identification (RFID) system according to one embodiment includes a chain of radiating elements; a transmission line; and power dividers coupled along the transmission line, the power dividers coupling the transmission line to each of the radiating elements, the power dividers being configured such that each radiating element receives about a same amount of power from the transmission line.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, as used herein, the term "about" with reference to some stated value refers to the stated value±10% of said value.

In one general embodiment, an RFID system includes a chain of radiating elements; a transmission line; and power dividers coupled along the transmission line, the power dividers coupling the transmission line to each of the radiating elements, the power dividers being configured such that each radiating element receives about a same amount of power from the transmission line.

Figure 1:
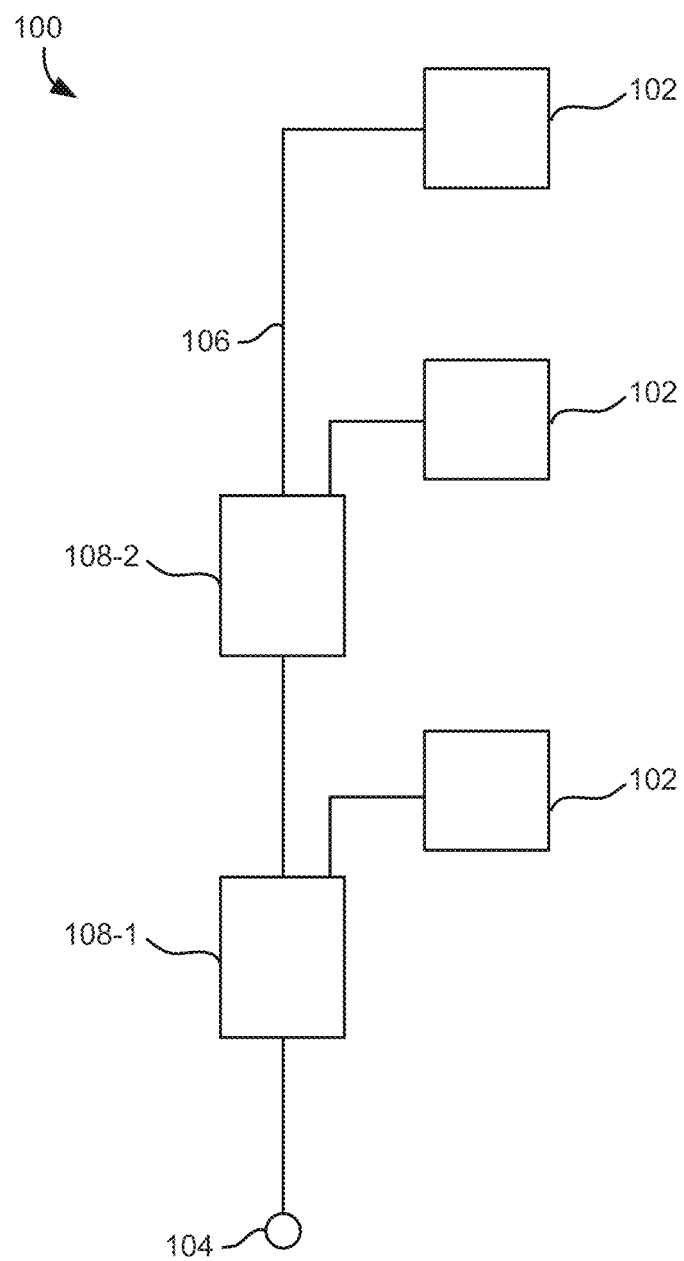
FIG. 1 is a chain antenna system according to one embodiment.

FIG. 1 depicts a chain antenna system 100 according to one embodiment, which may be used with an RFID interrogator. As shown, the system 100 has three radiating elements 102, though various other systems may have two, four, five, etc., or more radiating elements. See, e.g., FIGS. 2-5. Accordingly, various components of FIGS. 2-5 have common numbering with those of FIG. 1. Furthermore, illustrative radiating elements are described below. See, e.g., FIGS. 7-9.

Referring still to FIG. 1, a feeding port 104 is provided for coupling the system 100 to an RF device such as an RFID interrogator or other transceiver. The transmission path coupling each radiating element to the feeding port 104 includes a transmission line 106 and power dividers 108-1, 108-2. It follows that the power dividers 108-1, 108-2 are coupled along the transmission line 106 for coupling the transmission line 106 to each of the radiating elements 102. Alternative approaches for creating a chain of radiating elements include providing individual cabling between the interrogator and each of the radiating elements. However, this approach may require significant amounts of cabling. Various embodiments described herein overcome this disadvantage by using only a single cable (e.g., the transmission line 106) to couple the power dividers to the feeding port.

Each of the power dividers divide the energy being input thereto between the radiating element coupled to the respective power divider, and the transmission line at the outlet of the power divider, preferably such that each radiating element receives about the same amount of power as the others. Such approaches desirably provide a more uniform RF field in a vicinity of each of the radiating elements, thereby enabling about a same interrogation capability for transponders in the volume facing the radiating elements.

According to an illustrative example of the embodiment shown in FIG. 1, which is in no way intended to limit the invention, power divider 108-1 provides about ⅓ of the signal to the radiating element, and about ⅔ of the signal to the next power divider 108-2. Power divider 108-2 splits the remaining signal in half, providing each half to the radiating elements coupled thereto. Thus, each of the radiating elements provides a substantially similar RF field.

If radiating elements were connected in series without power dividers positioned therebetween, the strength of the RF fields would be stronger at the side closer to the feeding port, and weaker at the end of the chain of radiating elements farthest from the feeding port, thereby creating a lopsided interrogation field. Moreover, a lopsided interrogation field may result if the power dividers are not properly calibrated based on the number of radiating elements. Therefore, it follows that the power dividers are calibrated using preferred equations. An illustrative equation that may be used to determine the split value for the power divider is as follows: $A=10 \log(1/n)$, where A is the attenuation value (e.g., in dB) of the power divider at position "n" in the chain of radiating elements.

The spacing between the radiating elements is preferably close enough that there are no gaps present between adjacent radiating elements in the effective RF field generated thereby. In another approach, the spacing between the radiating elements may be long enough to provide separate, nonoverlapping volumes of space, each having about an equal and/or uniform strength of electromagnetic field. Note that while outer fringes of the fields from adjacent radiating elements may overlap, the volumes of space having the uniform strength of electromagnetic field are spatially separated by some distance. An example of such an embodiment may be one or several radiating elements in each of the several rooms along a hallway. Such distances can be determined by modeling and/or experimentation with a prototype constructed according to the teachings presented herein.

Illustrative distances between adjacent radiating elements may range from a few inches to 10 feet or more. In some approaches, the length of the transmission line spanning the distance between each of the power dividers may be short enough to provide a negligible loss, e.g., less than about 2%, preferably less than about 1% of the energy is lost along the transmission line. However, longer transmission line spans and/or transmission line spans providing higher amounts of loss (e.g., energy loss) may also and/or alternatively be used. In such embodiments, energy loss may be considered, if desired, when setting the division values of the power dividers. Thus, the power dividers may be configured to compensate for loss of energy in the transmission line.

Figure 2:
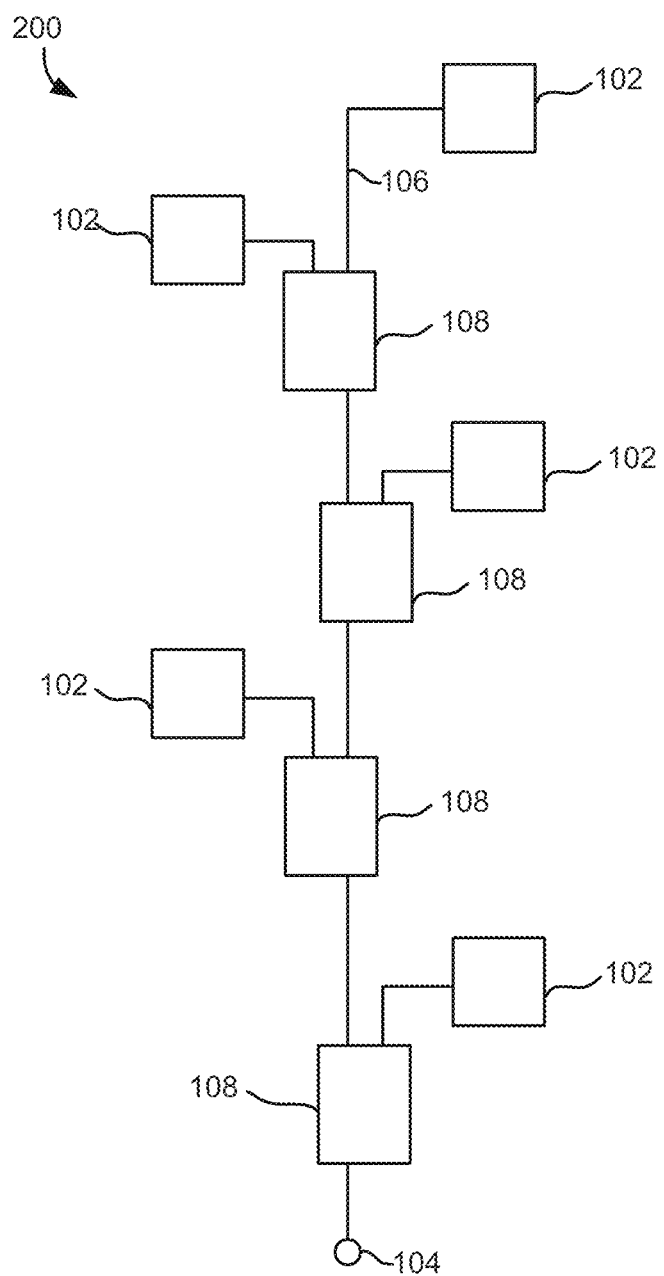
FIG. 2 is a chain antenna system according to one embodiment.

FIG. 2 illustrates a system 200 having five radiating elements in accordance with one embodiment. As an option, the present system 200 may be implemented in conjunction with features from any other embodiment listed herein, such as those described with reference to the other FIGS. Of course, however, such system 200 and others presented herein may be used in various applications and/or in permutations which may or may not be specifically described in the illustrative embodiments listed herein. Further, the system 200 presented herein may be used in any desired environment. Thus FIG. 2 (and the other FIGS.) should be deemed to include any and all possible permutations.

Referring now to FIG. 2, it should be noted that although the radiating elements are illustrated as being positioned on opposite sides of an axis (e.g., as represented generally by the transmission line 106), according to other embodiments, the radiating elements may be positioned along a common side of an axis, on opposite sides of an axis, along a single straight line, etc. When the radiating elements are positioned on opposite sides of an axis, they are each preferably positioned about a same distance from the axis.

Figure 3:
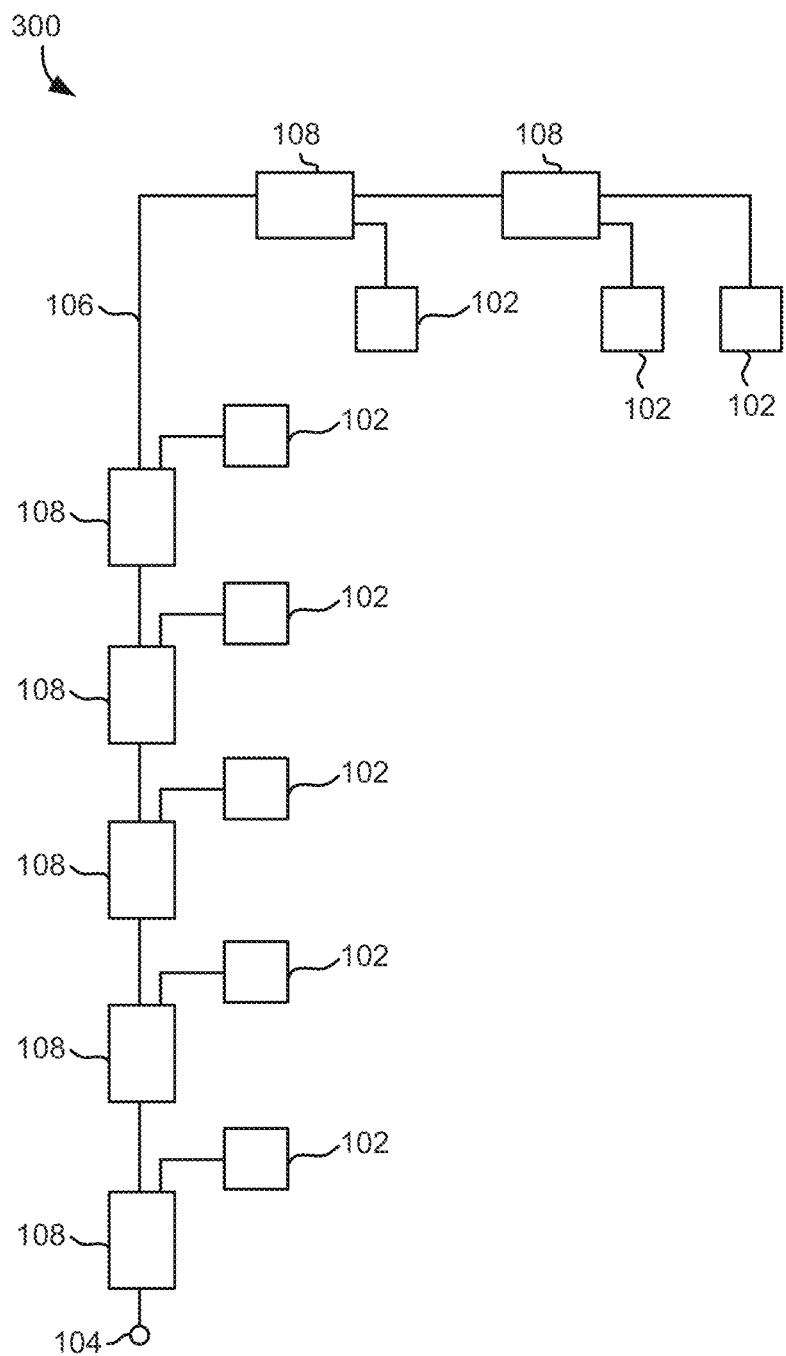
FIG. 3 is a chain antenna system according to one embodiment.

FIG. 3 illustrates a system 300 having eight radiating elements in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment. Thus FIG. 3 (and the other FIGS.) should be deemed to include any and all possible permutations.

Referring now to FIG. 3, a negligible loss is assumed along each segment of the transmission line for the system 300. Moreover, as previously mentioned, although each of the radiating elements 102 is positioned along a common side of an axis (e.g., the transmission line 106), they may have an alternate configuration in other embodiments, e.g., see FIG. 10A.

Figure 4:
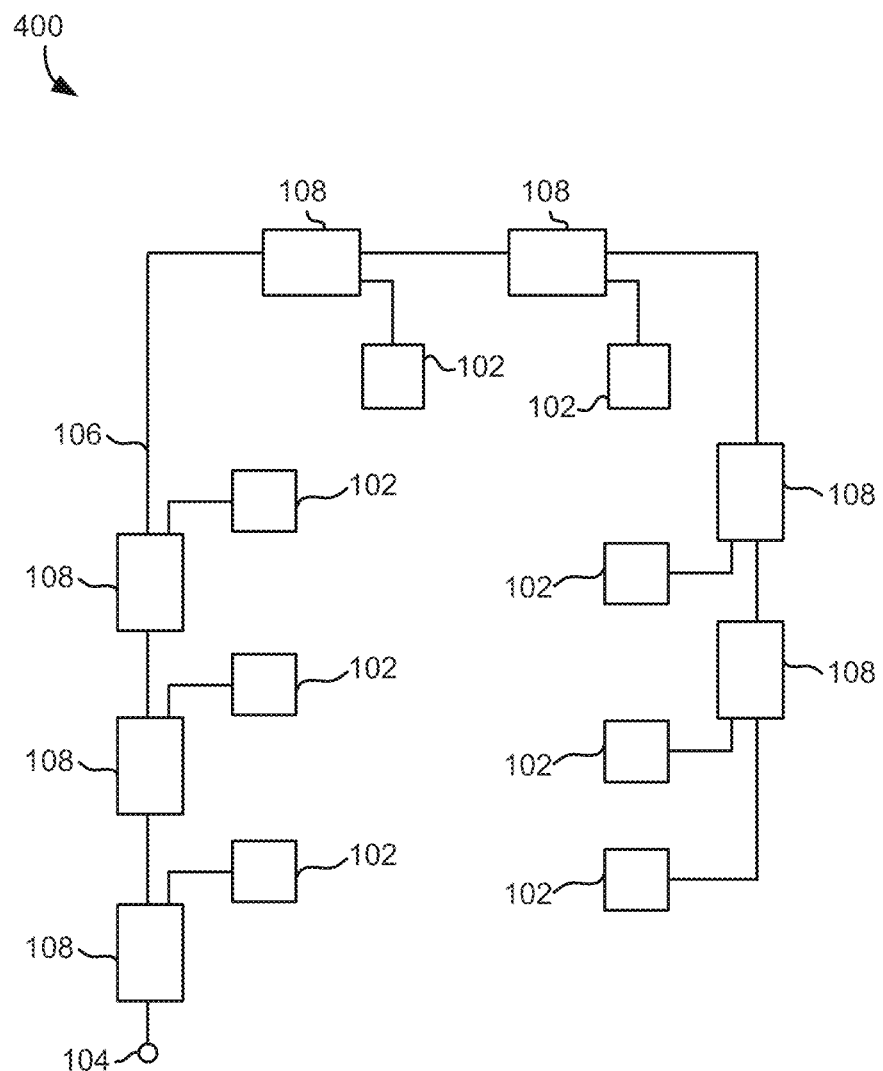
FIG. 4 is a chain antenna system according to one embodiment.

FIG. 4 illustrates a system 400 having eight radiating elements in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) should be deemed to include any and all possible permutations.

The exemplary embodiment depicted in FIG. 4, includes a 915 MHz, RG-178 transmission line 106 extending about one foot between each of the power dividers 108. Moreover, a cable loss (CL) of about 0.45 dB along the transmission line 106 between each divider 108 is considered. The attenuation value An (e.g., in dB) of the power divider at position "n" in the chain of radiating elements is calculable using the illustrative equation as follows: $An=10 \log(1/n)-(n-1)*(CL/2)$. Thus, the power divider at the eighth position (power divider closest to the feeding port 104 in this example) has an attenuation value of $10 \log(1/8)-(8-1)*(CL/2)$.

Additional cable loss values are also presented in FIG. 4 according to different exemplary embodiments. For example, an RG-316 cable operating at a frequency of about 1000 MHz has a cable loss of about 0.27 dB/ft.

Further exemplary values and equations are presented along the transmission line presented in FIG. 4 of U.S. Provisional Patent Application No. 61/774,457 filed on Mar. 7, 2013, which has been incorporated by reference. Accordingly, the present system 400 of FIG. 4 may include any of the values presented therein, depending on the desired embodiment. Furthermore, additional illustrative values and equations (e.g., for cable loss) are presented in other FIGS. of U.S.

Provisional Patent Application No. 61/774,457 filed on Mar. 7, 2013, any and/or all of which may be incorporated in the various approaches described herein as would be appreciated by one skilled in the art upon reading the present description.

Figure 5:
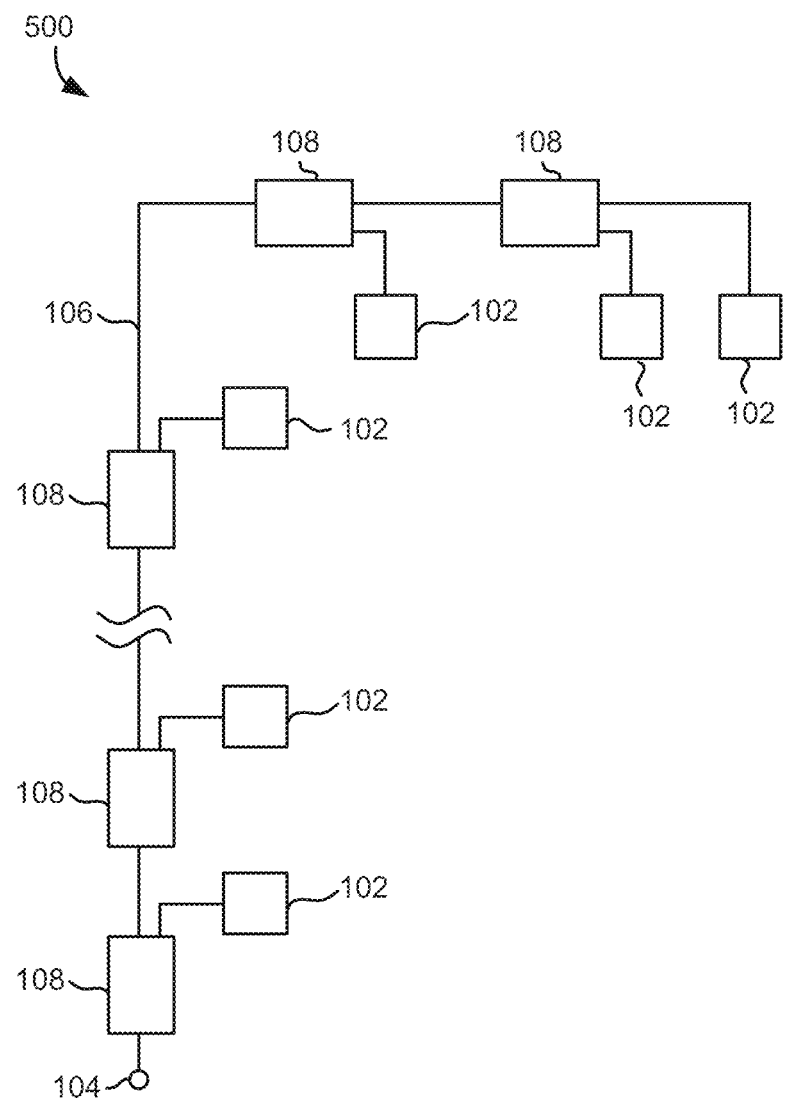
FIG. 5 is a chain antenna system according to one embodiment.

Looking now to FIG. 5, system 500 illustrates an embodiment having "n" radiating elements 102, for which loss (e.g., cable loss) along the transmission line 106 is considered. Note that the attenuation value An (e.g., in dB) of the power divider 108 at position "n" in the chain of radiating elements may be calculated using the illustrative equation $An=10 \log(1/n)-(n-1)*(CL/2)$ as presented above with reference to FIG. 4. It follows that any of the approaches described above may be implemented with the system 500 of FIG. 5.

Moreover, in some embodiments the power divider 108 may be realized as power divider hybrid circuits with a transmission line technique. Examples of such transmission line techniques may be found in U.S. Pat. No. 3,484,724 entitled "Transmission Line Quadrature Coupler" which is herein incorporated by reference; and Kai Chang and Lung-Hwa Hsieh "Microwave Ring Circuit and Related Structures" John Wiley & Sons 2004, pp. 197-240. Moreover, for smaller sizes (e.g., of the power divider 108), the power divider hybrid circuits may be produced using a lumped components technique which is described in detail in U.S. Pat. No. 4,851,795 entitled "Miniature Wide-Band Microwave Power Divider" which is herein incorporated by reference; in addition to Fusco, V. F. and S. B. D. O'Caireallain "Lumped Element Hybrid Networks for GaAs MMICs" Microwave Optical Tech. Lett., Vol. 2, January 1989 pp. 19-23.

Figure 6:
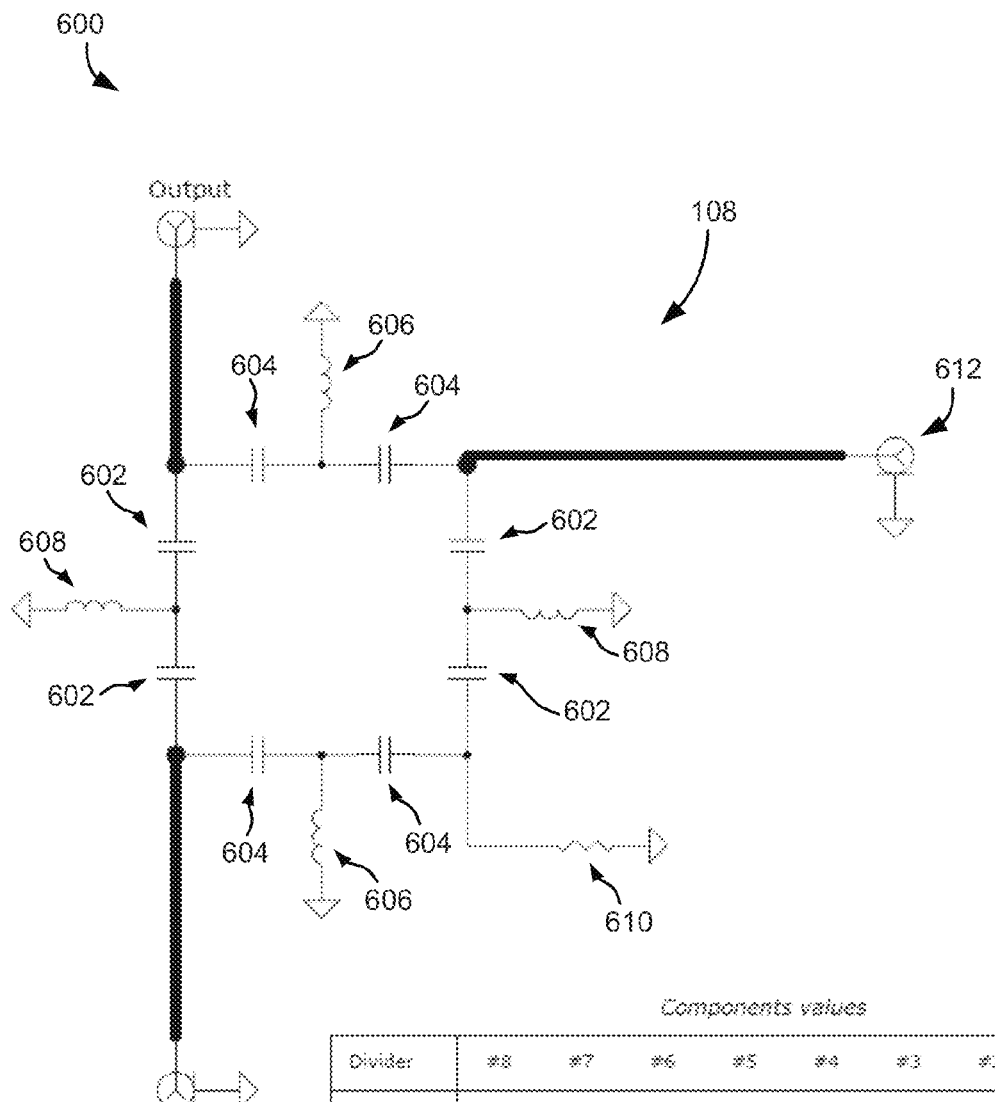
FIG. 6 is a circuit diagram of a power divider according to one embodiment.

FIG. 6 depicts a circuit diagram 600 of an illustrative power divider 108 realized with lumped passive components according to one exemplary embodiment. As an option, the present circuit diagram 600 may be implemented in conjunction with features from any other embodiment listed herein, such as those described with reference to the other FIGS. Of course, however, such circuit diagram 600 and others presented herein may be used in various applications and/or in permutations which may or may not be specifically described in the illustrative embodiments listed herein. Further, the circuit diagram 600 presented herein may be used in any desired environment. Thus FIG. 6 (and the other FIGS.) should be deemed to include any and all possible permutations.

Looking now to FIG. 6, the circuit diagram 600 of the illustrative power divider 108 includes first capacitors 602, second capacitors 604, first inductors 606, second inductors 608, and 50 ohm resistor 610. Moreover, power divider 108 is coupled to transmission line (e.g., see 106 of FIGS. 1-5) via Input and Output ports. The power divider 108 is additionally coupled to a radiating element (e.g., see 102 of FIGS. 1-5) via port 612. It follows that Input port, Output port and/or port 612 may include any port which would be apparent to one skilled in the art upon reading the present description.

Illustrative values for the first capacitors 602, second capacitors 604, first inductors 606, second inductors 608, and resistors 610 are presented for an embodiment having seven power dividers (i.e., #2-#8). Moreover, attenuation values are also presented for each of the power dividers. In most embodiments, power dividers may be realized with distributed strip lines, microstrip lines, or distributed lines combined with lumped components. Therefore, it should be noted that the values provided are presented by way of example only, and those skilled in the art, once armed with the teachings presented herein, would appreciate how to determine values for a given implementation when creating embodiments of the present invention. Thus, other embodiments having seven power dividers may have different values than those introduced in FIG. 6.

The radiating elements according to any of the embodiments described and/or suggested herein may be of any type known in the art. Examples include dipole antennas, helix antennas, patch antennas, etc. In preferred embodiments, the radiating elements are polarized radiating elements such as linear and/or circular polarized antennas.

Figure 7:
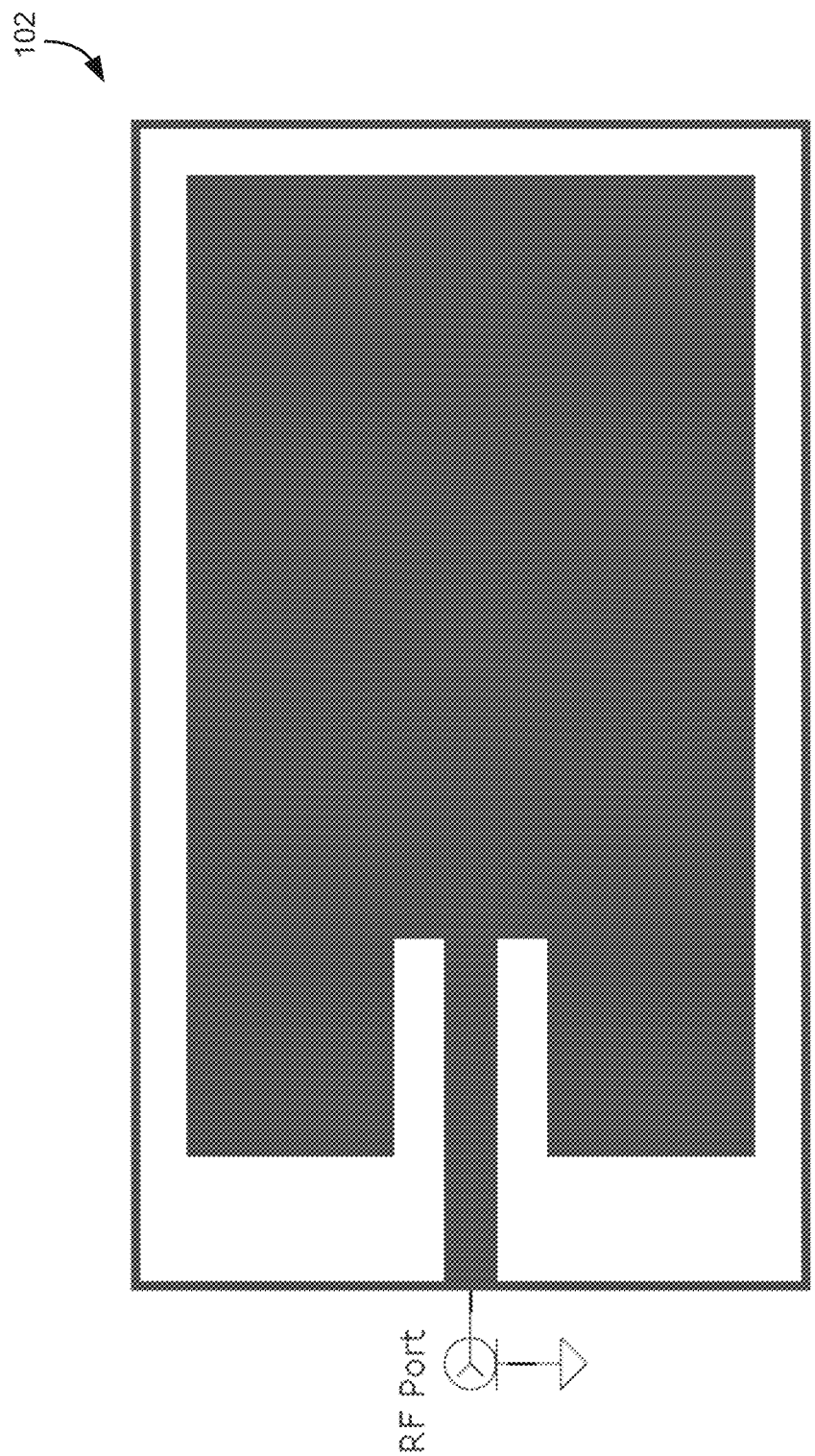
FIG. 7 is a linear polarized radiating element according to one embodiment.
Figure 8:
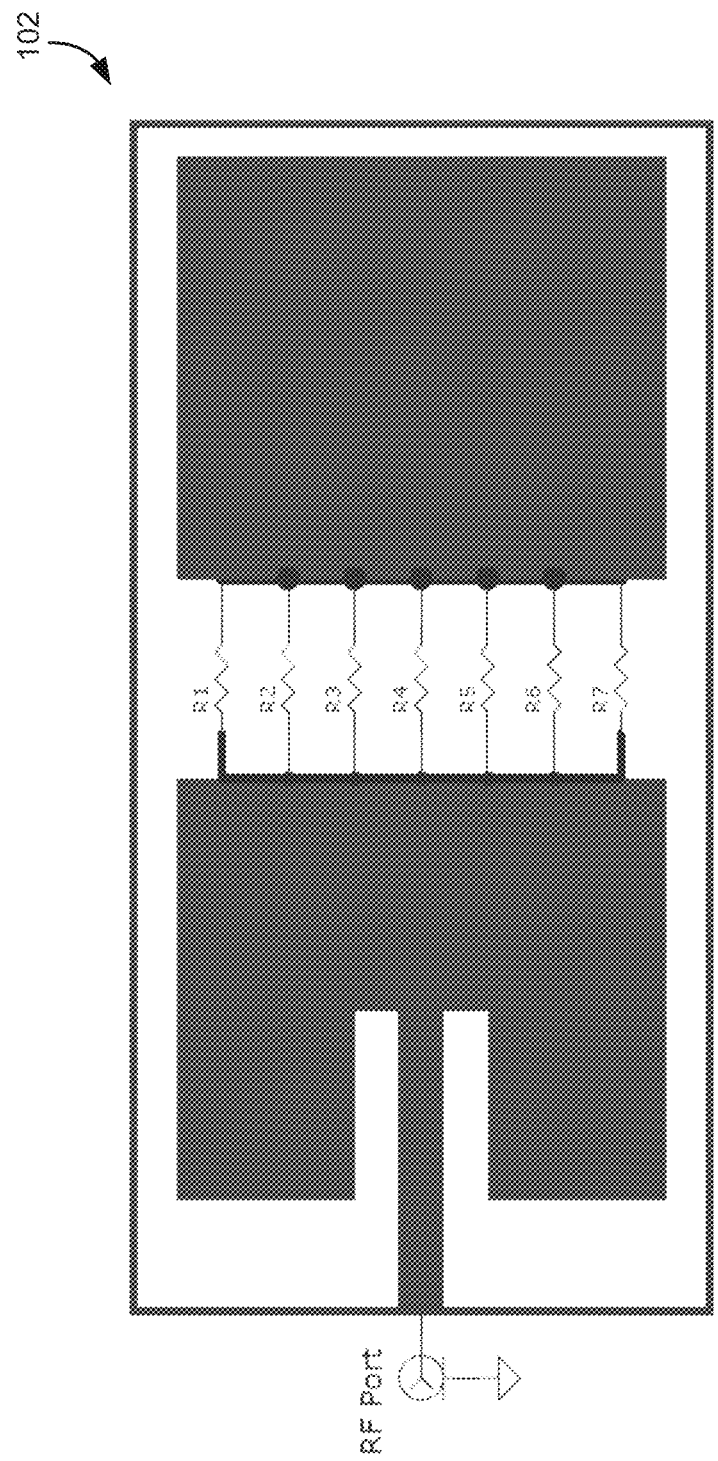
FIG. 8 is a linear polarized radiating element according to one embodiment.

FIG. 7 illustrates a linear polarized radiating element 102 according to one embodiment. Such antenna may be a simple, generally rectangular patch antenna. For example, in one approach, the antenna may be formed as a top conductive material radiating element, positioned above the bottom conductive layer as common signal ground. However, in another approach, the antenna may be positioned and/or formed on a substrate of a type known in the art. According to one example, the antenna may be positioned between top and bottom conductive layers which is described in further detail in U.S. Pat. No. 4,072,951 entitled "Notch fed twin electric micro-strip dipole antennas" and/or U.S. Pat. No. 4,291,312 entitled "Dual ground plane coplanar fed microstrip antennas" which are herein incorporated by reference.

Referring still to FIG. 7, in some embodiments, it may be desirable to increase the frequency bandwidth and reduce the efficiency of a given antenna. According to one approach, these desired effects may be achieved by implementing a resistive loading technique.

Further description of such resistive loading techniques may be found in any of the following publications: U.S. Pat. No. 2,145,024 entitled "Directive antenna" which is herein incorporated by reference; U.S. Pat. No. 3,803,615 entitled "Resistive loading technique for antennas" which is herein incorporated by reference; S. V. Hum, J. Z. Chu, R. H. Johnston, M. Okoniewski, "Efficiency of a Resistively Loaded Microstrip Patch Antenna." IEEE antennas and wireless propagation letters, VOL. 2, 2003, p. 22-25; CHENG-SHONG HONG, "Gain-Enhanced Broadband Microstrip Antenna." Proc. Natl. Sci. Counc. ROC(A), Vol. 23, No. 5, 1999. pp. 609-611; Hong-Twu Chen., "Compact circular microstrip antenna with embedded chip resistor and capacitor.", Antennas and Propagation Society International Symposium, 1998. IEEE (Volume 3) pp. 1356-1359. However, it should be noted that in the foregoing cited publications, resistive components are positioned and/or connected between radiating elements and common signal ground. Therefore, such embodiments undesirably require extra conductive vias and introduce extra cost in production.

Referring again to the present description, in some embodiments, a resistive load may be positioned in the gap of a radiating element, e.g., where the maximum current flows along the radiating element. As noted in FIG. 8, the radiating element 102 (e.g., antenna) may be divided into two separate segments, e.g., to introduce additional losses. In the embodiment shown, for example, a patch antenna similar to the radiating element 102 of FIG. 7 is separated into two portions which are coupled together with short resistors (R1-R7) to induce losses. This is particularly useful when using radiating elements (e.g., antennas) that operate similar to and/or the same as a thin substrate patch antenna that have a narrow frequency bandwidth. Furthermore, similar results may be achieved by decreasing the sensitivity of antenna parameters to objects positioned close to the radiating element.

The radiating elements may include circular polarized radiating element. Examples of circular polarized radiating elements are presented in U.S. Pat. No. 5,216,430 entitled "Low impedance printed circuit radiating element" which is herein incorporated by reference.

Figure 9:
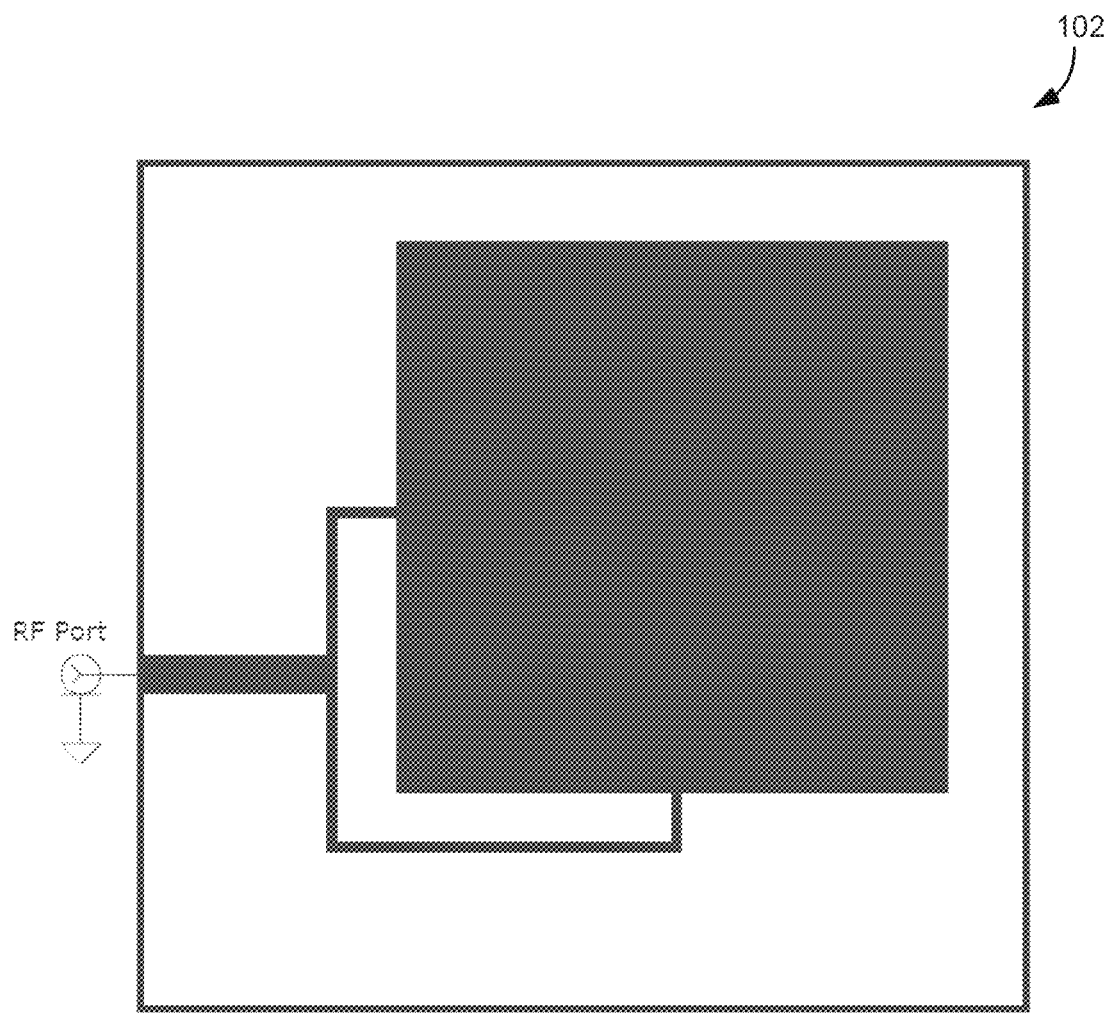
FIG. 9 is a circular polarized radiating element according to one embodiment.

However, FIG. 9 depicts an exemplary configuration, though, as in any of these embodiments, any radiating element configuration known in the art may be used. The dimensions of a given radiating element may be selected using known methods, e.g., based on the wavelength(s) of the RF signals being used. Moreover, conventional materials may be used to construct the radiating elements in various approaches.

Figure 10A:
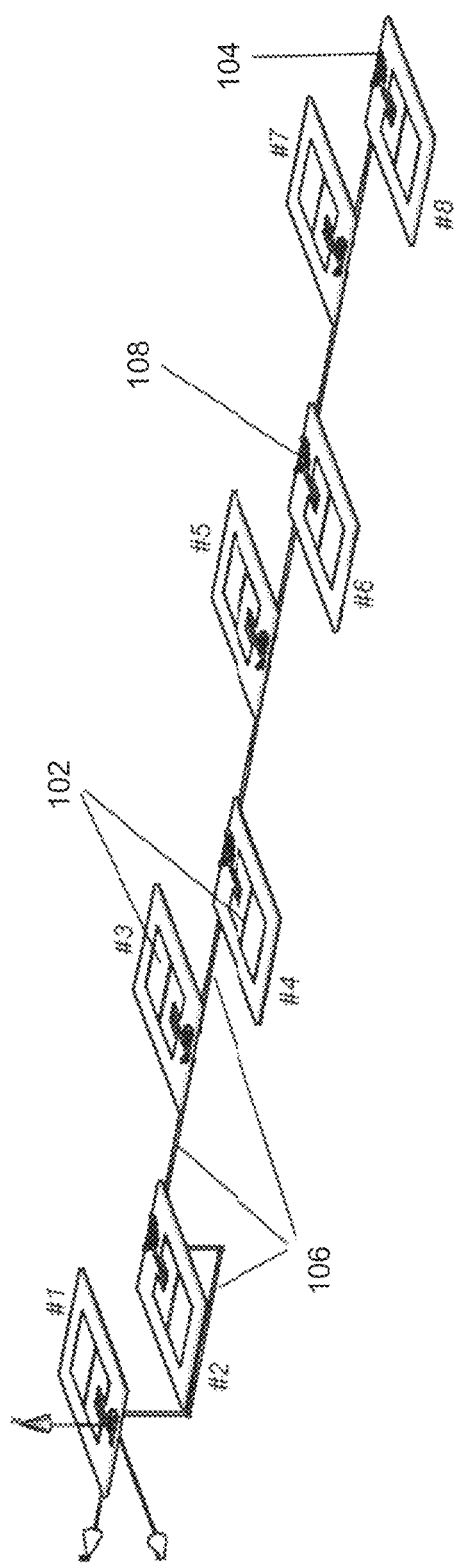
FIG. 10A is a chain antenna system according to one embodiment.

As previously mentioned, FIG. 10A is an exemplary implementation of the embodiment shown in FIG. 3. It follows that various components of FIG. 10A may be the same and/or similar to any of those presented above, and therefore have common numbering with the components of FIG. 3. Looking specifically now to FIG. 10A, the radiating elements 102 are disposed on alternating sides of the transmission line 106.

Figure 10B:
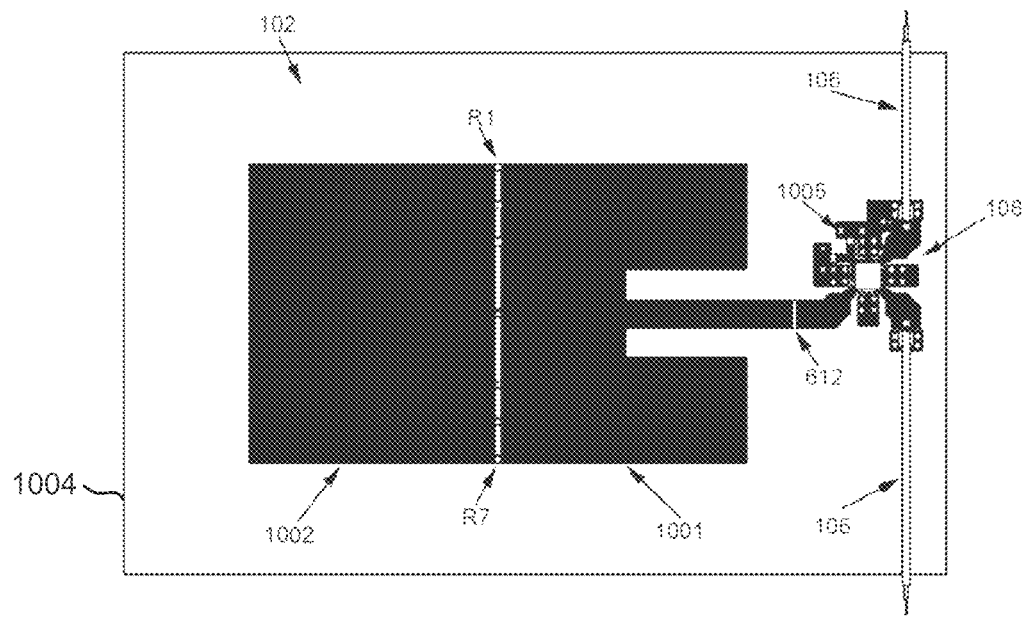
FIG. 10B is a top view of a radiating element combined with a power divider according to one embodiment.
Figure 10C:
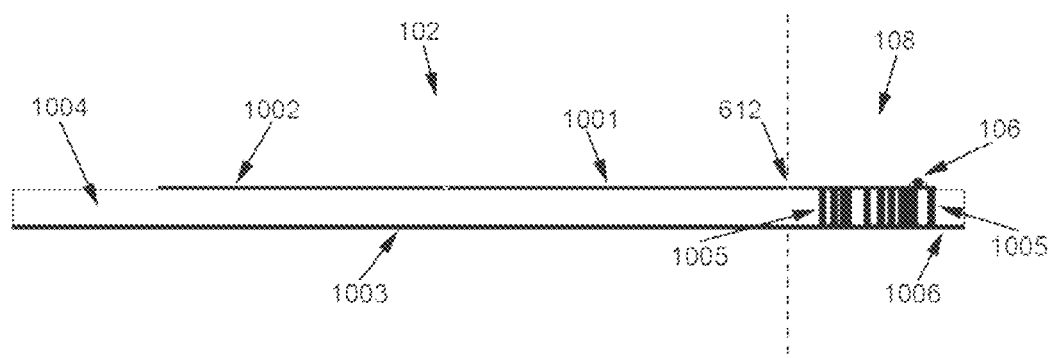
FIG. 10C is a side view of a radiating element combined with a power divider according to one embodiment.

Moreover, looking to FIGS. 10B-10C, top down view and side-view of an embodiment substantially similar to that illustrated in FIG. 10A are presented, respectively. Looking to the top down view and side-view, radiating element 102 is illustrated as being combined with power divider 108 on a common dielectric substrate 1004. Resistive loads R1-R7 are positioned between separate portions 1001 and 1002 of radiating element 102.

Port 612 of the power divider is coupled to a first portion 1001 of the radiating element 102. Furthermore, transmission lines 106 are preferably coaxial cables, and are positioned above power divider 108.

Signal ground 1003 of radiating element 102 is connected with signal ground 1006 of power divider 108. Moreover, signal ground 1006 is connected with signal ground vias 1005.

The embodiment illustrated in the views of FIGS. 10B-10C desirably positions the power divider 108 on the same thick dielectric substrate as the radiating element 102. Although this method may introduce extra cost in production, there is also way to separate signal ground of the radiating element 1003 from signal ground of the power divider 1006. As a result, this will desirably allow to use different materials and different thicknesses of substrates for the radiating element and the power divider.

Figures 11A, 11B:
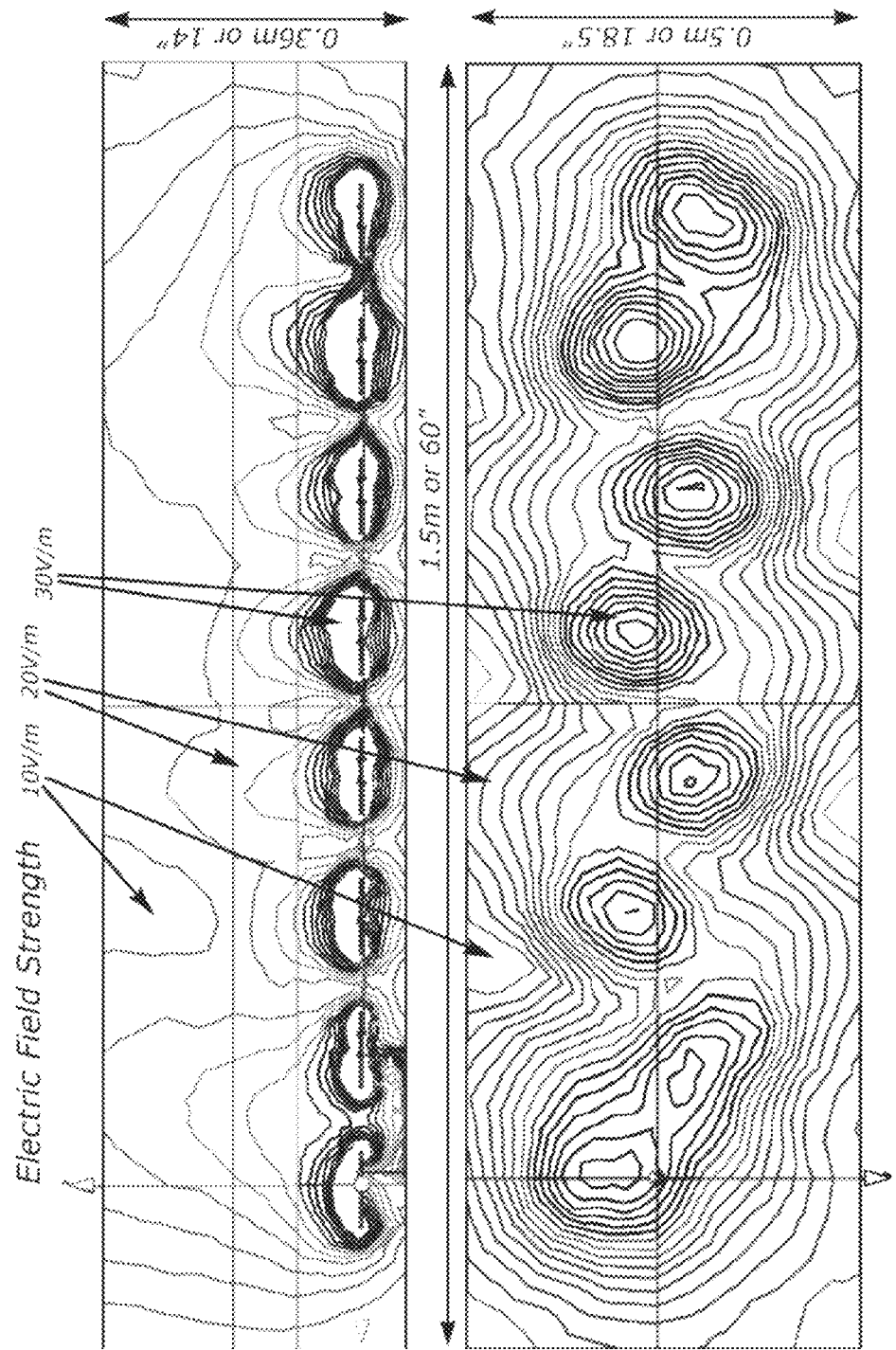
FIG. 11A is a diagram showing a side-view of the electric field strength distribution of the chain antenna system of FIG. 10.
FIG. 11B is a diagram showing a top down view the electric field strength distribution above the chain antenna system of FIG. 10.

FIGS. 11A-11B depict side-view and top down views, respectively, of the electric field strength distribution of the illustrative embodiment of FIG. 10A along the transmission line 106 thereof. This embodiment considers the RFID Tag with antenna as a dipole type, and it is mostly coupling with antennas through the electric field in the proximity of the radiating element(s).

Looking to the electric field strength distribution of FIGS. 11A-11B, the contour lines represent electric field gradients. Moreover, it should be noted that the contour line nodes represent the location of the radiating elements of claim 10 positioned along the transmission line. As seen in the distributions of FIGS. 11A-11B, the electrical field strength farther away from the contour line nodes is about 10 V/m, while the field strength at about the contour line nodes is about 30 V/m.

Figure 12:
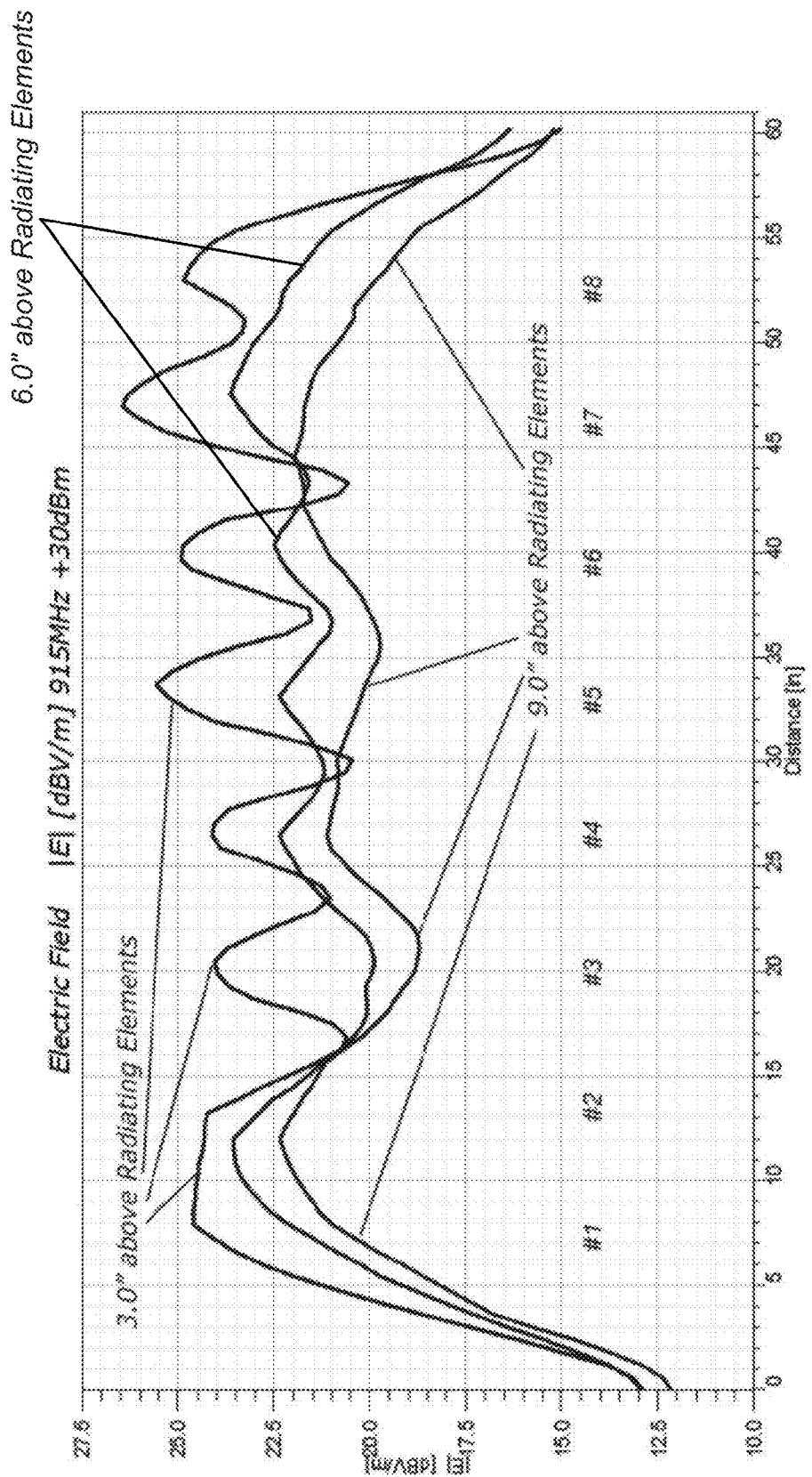
FIG. 12 is a graph showing the distribution of the electric field strengths above the radiating elements along the chain antenna system of FIG. 10.

FIG. 12 depicts how the electrical fields as seen in FIGS. 11A-11B are distributed above the radiating elements. In FIG. 12, plots of the electric field strength along the lines at 3, 6 and 9 inches above the radiating elements are shown. It is apparent that electric field strengths at 3-6 inches above have about a 5-6 dB variation only. Furthermore, at 9 inches above, the variation is only about 3 dB, indicating that the field is fairly uniform. Thus, in one approach, an electric field strength along a plane positioned 9 inches above the radiating elements, and between outermost of the radiating elements, preferably has a variation of less than 5 dB.

Referring back to FIG. 5, an embodiment having "n" radiating elements 102, for which loss (e.g., cable loss) along the transmission line 106 is considered, a balun circuit and/or differential hybrid power divider may be added.

Figure 13:
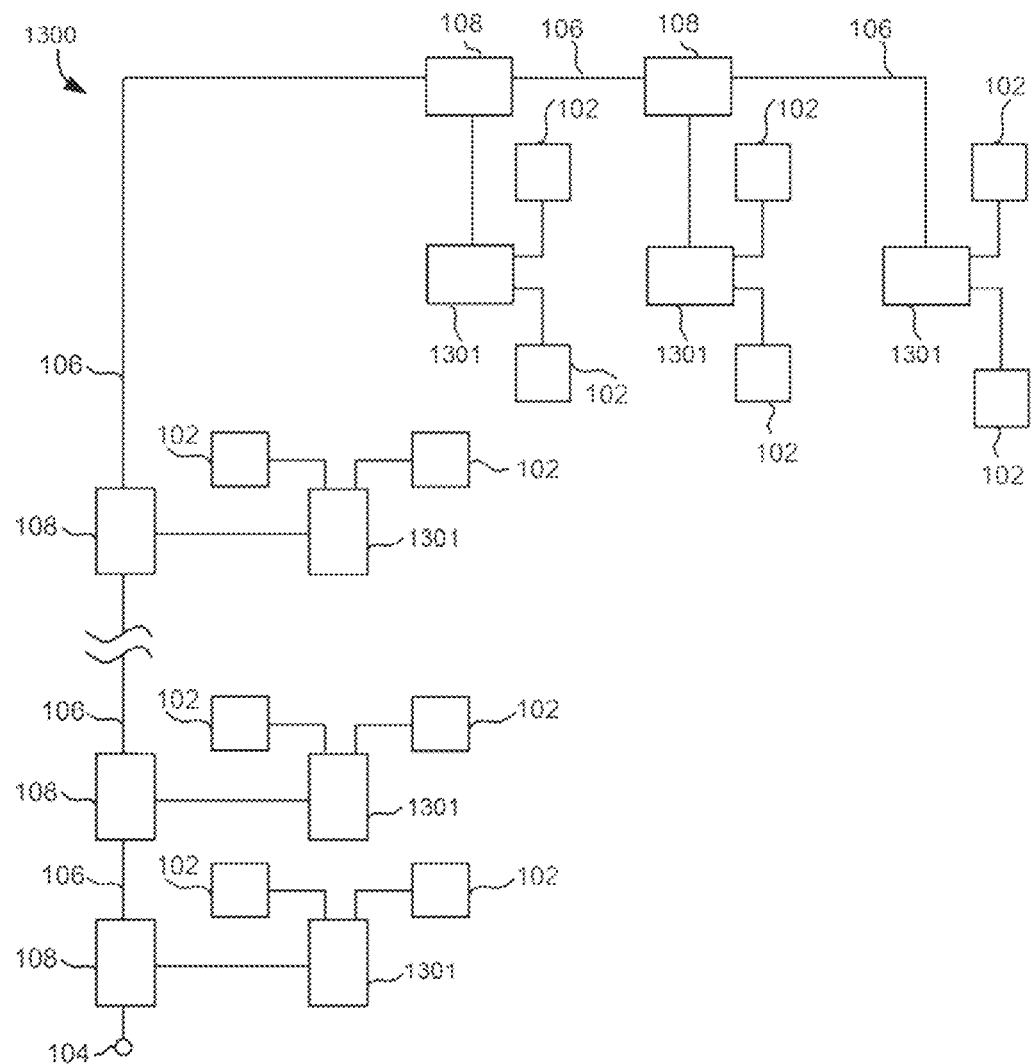
FIG. 13 is a circuit diagram of a chain antenna system according to one embodiment.

Looking now to FIG. 13, a circuit diagram of a chain antenna system 1300 is illustrated according to one embodiment. As an option, the present chain antenna system 1300 may be implemented in conjunction with features from any other embodiment listed herein, such as those described with reference to the other FIGS. Of course, however, such chain antenna system 1300 and others presented herein may be used in various applications and/or in permutations which may or may not be specifically described in the illustrative embodiments listed herein. Further, the chain antenna system 1300 presented herein may be used in any desired environment. Thus FIG. 13 (and the other FIGS.) should be deemed to include any and all possible permutations.

As previously mentioned, the chain antenna system 1300 includes a differential hybrid power divider 1301. In other approaches, the differential hybrid power divider 1301 may alternatively include a baluns, a 180 degree powers divider, etc., or other types of distribution power dividers that would be apparent to one skilled in the art upon reading the present description.

It is preferred that the differential hybrid power divider 1301 divides an input signal between two output signals with equal amplitude and with a phase difference of 180 degrees. According to the embodiment illustrated in FIG. 13, the differential hybrid power dividers 1301 will desirably excite the two attached radiating elements 102 in opposite phase, e.g., separated by about 180 degrees.

Furthermore, power dividers 108 preferably maintain a uniform energy distribution along the chain of radiating elements 102. Thus, other than the potential separation between the signal of the radiating element ground planes and the power dividers, such embodiments improve the uniformity of energy distribution in space above the radiating elements 102 in the chain antenna system 1300.

According to various embodiments, the 180 degree power divider hybrid circuits may be realized with a transmission line technique. Examples of such transmission line techniques may be found in the descriptions of the following references: U.S. Pat. No. 4,578,652 entitled "Broadband Four-Port TEM Mode 180° Printed Circuit Microwave Hybrid" which is herein incorporated by reference; and Kai Chang and Lung-Hwa Hsieh "Microwave Ring Circuit and Related Structures" John Wiley & Sons 2004, pp. 197-240.

Moreover, for embodiments having smaller sized chain antennas, 180° hybrid circuits may be produced with a lumped components technique. Examples of such lumped components techniques may be found in the descriptions of the following references: Parisi, S. J., "180 degrees lumped element hybrid". Microwave Symposium Digest, 1989., IEEE MTT-S International, pp. 1243-1246, vol. 3; and Parisi, S. J., "A Lumped Element Rat Race Coupler", Applied Microwave August/September 1989 pp. 85-93.

Figure 14:
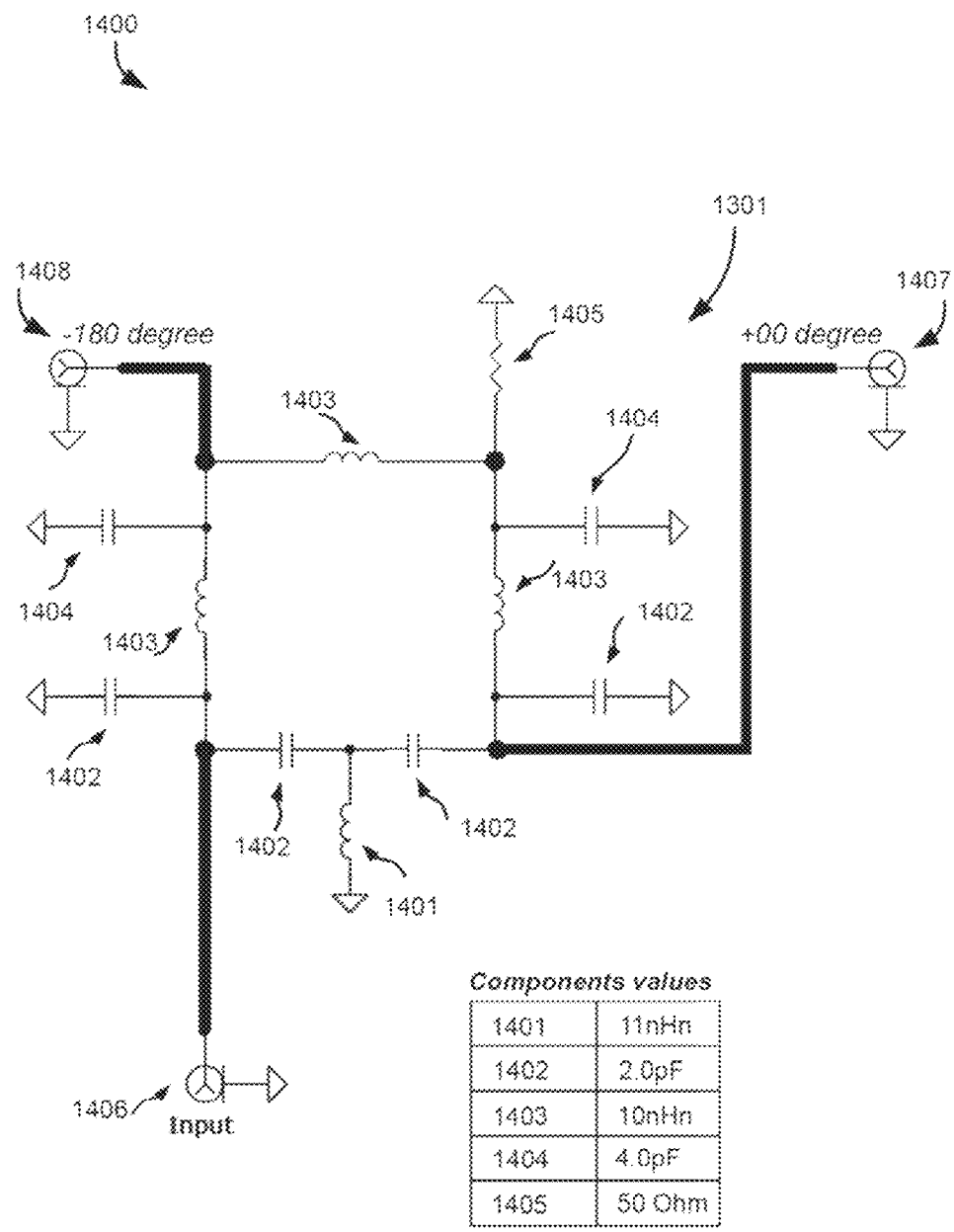
FIG. 14 is a circuit diagram of a 180 degree power divider according to one embodiment.

Referring now to FIG. 14, a circuit diagram 1400 of an illustrative power divider 108 realized with lumped components positioned on short microstrip lines is illustrated according to one exemplary embodiment. As an option, the present circuit diagram 1400 may be implemented in conjunction with features from any other embodiment listed herein, such as those described with reference to the other FIGS., such as FIG. 6. Of course, however, such circuit diagram 1400 and others presented herein may be used in various applications and/or in permutations which may or may not be specifically described in the illustrative embodiments listed herein. Further, the circuit diagram 14 presented herein may be used in any desired environment. Thus FIG. 14 (and the other FIGS.) should be deemed to include any and all possible permutations.

Looking now to FIG. 14, the circuit diagram 1400 of the illustrative power divider 108 includes components 1401, 1402, 1403. 1404. Exemplary values of the components 1401, 1402, 1403. 1404 are presented in the table of FIG. 14 by way of example only and are in no way intended to limit the invention. Moreover, the exemplary values correspond to a center frequency of about 915 MHz and have been updated (e.g., corrected) to alleviate any influence from microstrip lines.

Referring still to FIG. 14, input port 1406 may be connected to output port 612 of an energy distribution hybrid divider 108, e.g., as illustrated in FIG. 6. Moreover, output ports 1407 and 1408 of the circuit diagram 1400 may be connected to radiating elements 102, e.g., as depicted in FIG. 13. Moreover, the radiating elements 102 coupled to output ports 1407 and 1408 are preferably spaced about evenly from the differential hybrid power divider 1301. Thus, the radiating elements 102 coupled to output ports 1407 and 1408 may be positioned on opposite sides of an imaginary line of symmetry for the power divider 1301.

Figure 15A:
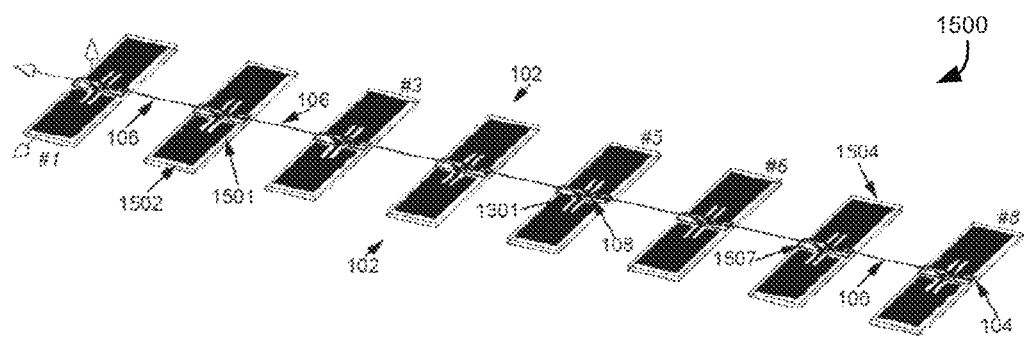
FIG. 15A is a perspective view of a chain antenna system according to one embodiment.
Figure 15B:
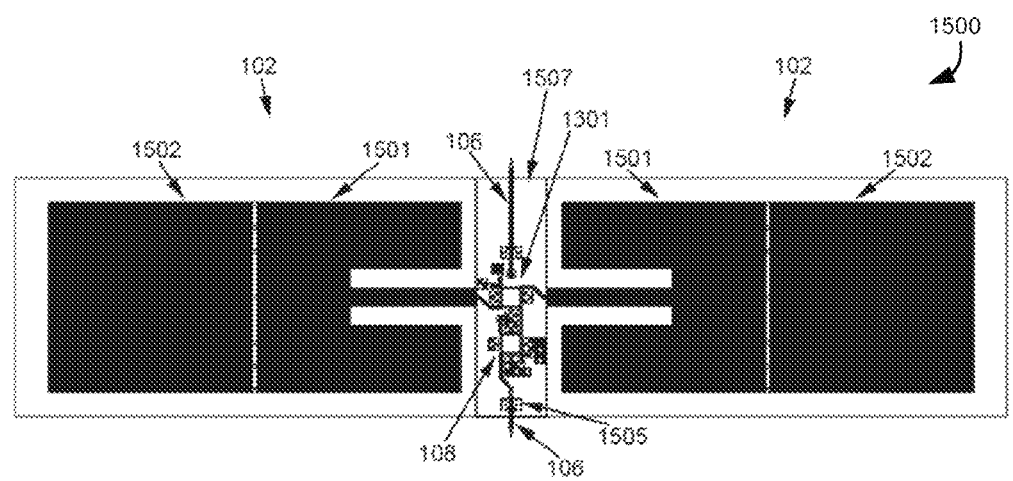
FIG. 15B is a top view of radiating elements combined according to one embodiment.
Figure 15C:
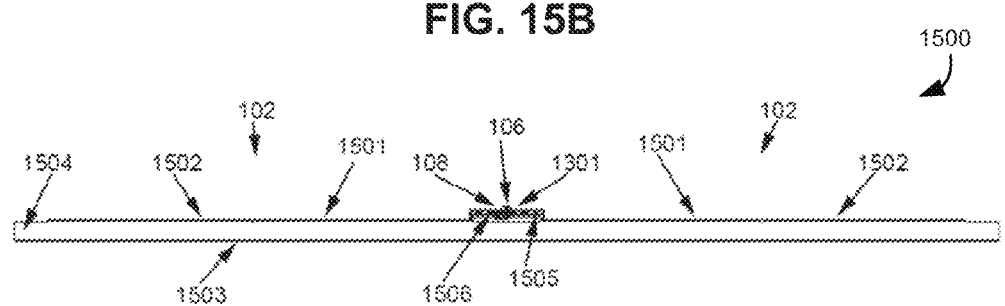
FIG. 15C is a side view of radiating elements combined with a 180 degree powers divider and distribution power divider according to one embodiment.

Looking now to FIGS. 15A-15C, the circuit diagram 1500 illustrated therein presents a possible implementation of a chain antenna system having 180 degree hybrid dividers 1301 and energy distribution hybrid dividers 108 as described above. As an option, the present circuit diagram 1500 may be implemented in conjunction with features from any other embodiment listed herein, such as those described with reference to the other FIGS. Of course, however, such circuit diagram 1500 and others presented herein may be used in various applications and/or in permutations which may or may not be specifically described in the illustrative embodiments listed herein. Further, the circuit diagram 1500 presented herein may be used in any desired environment. Thus FIGS. 15A-15C (and the other FIGS.) should be deemed to include any and all possible permutations.

The circuit diagram 1500 in FIGS. 15A-15C includes a radiating element 102 having two portions 1501, 1502. Moreover, radiating element 102 also has a common dielectric substrate 1504 and a common signal ground layer 1503. Furthermore, 180 degree hybrid divider 1301 and energy distribution hybrid divider 108 are positioned on a common dielectric substrate 1507, but separate from 1504. Dividers 1301 and 108 additionally and have a common signal ground layer 1506 which is separate from common signal ground layer 1503.

A small PCB power divider 1505 is also positioned above substrate 1504. The PCB power divider 1505 has radiating elements (not shown) which are connected to radiating elements 1501. Furthermore, feeding transmission lines 106 in the present embodiment include coaxial cable positioned above the PCB power divider 1505.

The power dividers implemented in the present embodiment are much smaller, and thinner than achievable in conventional products. Thus, the present embodiment may be manufactured using a standard printed circuit board (PCB) process which results in lower production costs. The embodiment illustrated in the circuit diagram 1500 also has a much shorter ground signal vias.

Figure 15D:
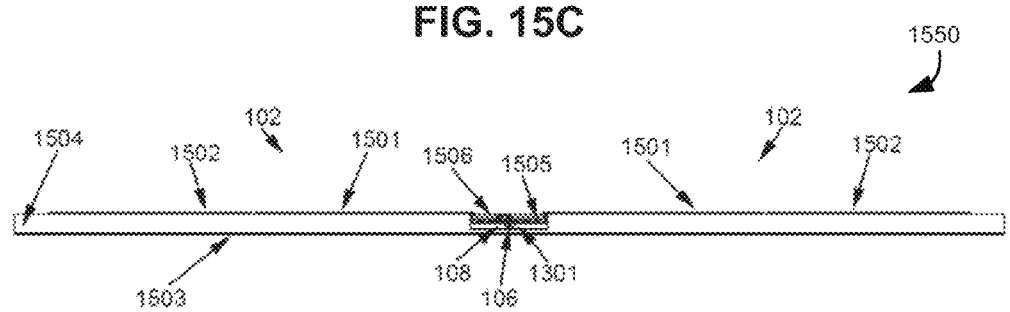
FIG. 15D is a side view of radiating elements combined with a 180 degree powers divider and distribution power divider according to one embodiment.

Another exemplary embodiment, which is in no way intended to limit the invention, is shown in the circuit diagram 1550 of FIG. 15D. As an option, the present circuit diagram 1550 may be implemented in conjunction with features from any other embodiment listed herein, such as those described with reference to the other FIGS. Of course, however, such circuit diagram 1550 and others presented herein may be used in various applications and/or in permutations which may or may not be specifically described in the illustrative embodiments listed herein. Further, the circuit diagram 1550 presented herein may be used in any desired environment. Thus FIG. 15D (and the other FIGS.) should be deemed to include any and all possible permutations.

The circuit diagram 1550 employs flexibility of design, as the common signal ground 1506 of the power dividers is not connected to the common signal ground 1503 of the radiating elements. Moreover, PCB with power divider is positioned upside down and in a cavity carved in dielectric substrate 1504 of radiating elements 102. Additionally, the transmission lines 106 are positioned in the same cavity as the dielectric substrate 1504. As a result, the assembly of the radiating elements 102, power dividers 108, 1301 and feeding lines 106 desirably becomes significantly thinner.

As mentioned above, the feeding transmission lines 106 in the present embodiment include coaxial cable. However, in other approaches, one or more of the transmission lines may include any conventional construction which would be apparent to one skilled in the art upon reading the present description.

According to various use embodiments, the power that may be provided to the system may depend on regulatory limits, such as the FCC in the US. However, in other embodiments, the power provided to a given system may be dependent on other factors, including, but not limited to, power supply limitations, operational capabilities of components in the system, desired electric field strengths, etc.

In use, the feeding port may be coupled to an RFID interrogator antenna port. The RFID interrogator may then operate similar to and/or the same as normal operation characteristics that would be expected by one skilled in the art armed with the teachings of the various embodiments described and/or suggested herein. The system may be used as a "transmit only configuration", a "receive only configuration", or a "send/receive configuration".

Various embodiments may be used to interrogate larger volumes than would be possible with a single radiating element. For example, the system may be used as a shelf antenna for interrogating items (e.g., RFID tags) positioned at various points along a shelf.

Many types of devices can take advantage of the embodiments disclosed herein, including but not limited to Radio Frequency Identification (RFID) systems (all Classes) and other wireless devices/systems; portable electronic devices such as portable telephones and other audio/video communications devices; and virtually any type of electronic device where an antenna is utilized. To provide a context, and to aid in understanding the embodiments of the invention, much of the present description shall be presented in terms of an RFID system such as that shown in FIG. 16. It should be kept in mind that this is done by way of example only, and the invention is not to be limited to RFID systems, as one skilled in the art will appreciate how to implement the teachings herein into electronics devices in hardware and, where appropriate, software. Examples of hardware include Application Specific Integrated Circuits (ASICs), printed circuits, monolithic circuits, reconfigurable hardware such as Field Programmable Gate Arrays (FPGAs), etc.

Figure 16:
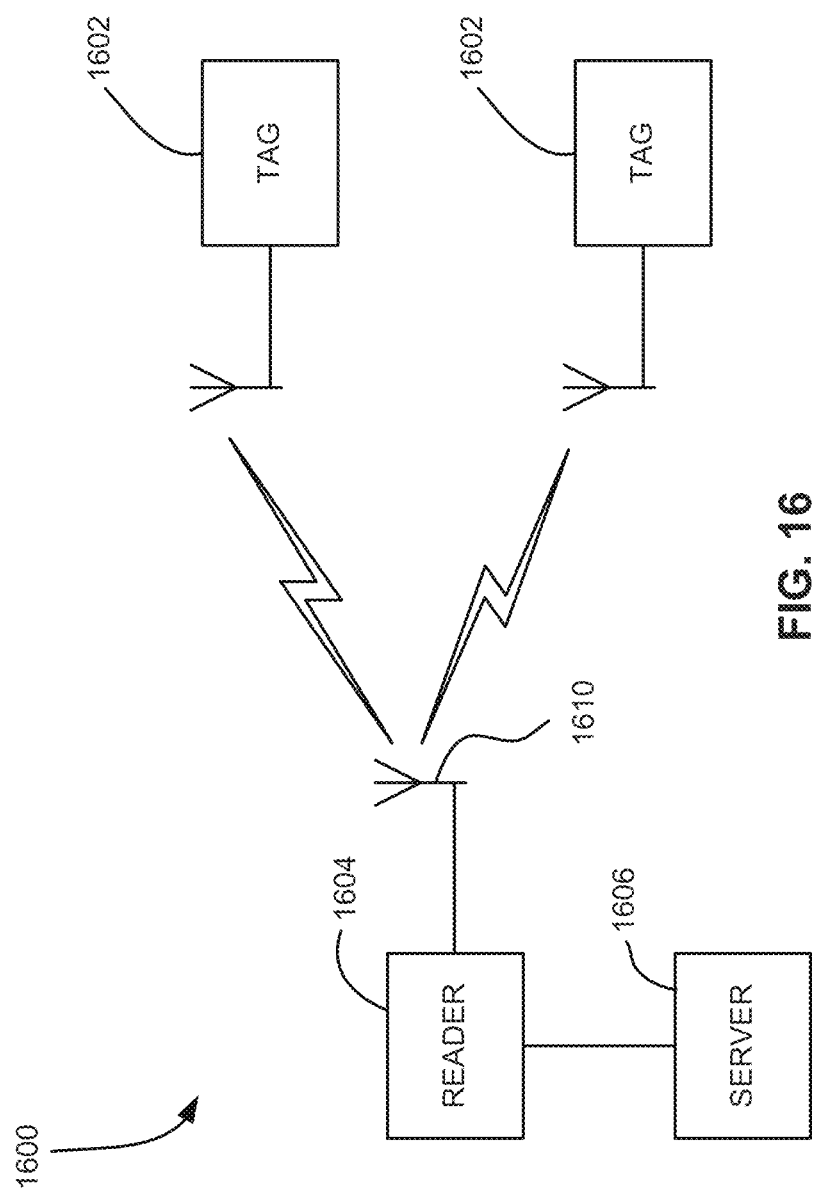
FIG. 16 is an RFID system according to one embodiment.

As shown in FIG. 16, an RFID system 1600 includes RFID tags 1602, a reader 1604, and an optional backend system, e.g., server 1606. Each tag 1602 includes an IC chip and an antenna. The IC chip includes a digital decoder needed to execute the computer commands that the tag 1602 receives from the tag reader 1604. In some tags 1602, the IC chip also includes a power supply circuit to extract and regulate power from the RF reader; a detector to decode signals from the reader, a backscatter modulator, a transmitter to send data back to the reader; anti-collision protocol circuits; and at least enough memory to store its EPC code.

Communication begins with a reader 1604 sending out signals via an antenna 1610 to find the tag 1602. When the radio wave hits the tag 1602 and the tag 1602 recognizes and responds to the reader's signal, the reader 1604 decodes the data programmed into the tag 1602 and sent back in the tag' reply. The information can then be passed to the optional server 1606 for processing, storage, and/or propagation to another computing device. By tagging a variety of items, information about the nature and location of goods can be known instantly and automatically.

RFID systems may use reflected or "backscattered" radio frequency (RF) waves to transmit information from the tag 1602 to the reader 1604. Since passive (Class-1 and Class-2) tags get all of their power from the reader signal, the tags are only powered when in the beam of the reader 1604. Class-3 and higher tags may include an on-board power source, e.g., a battery.

Additional illustrative examples of RFID systems, including RFID tags and readers, are described in U.S. patent application Ser. No. 11/367,061 filed Mar. 3, 2006 which is incorporated by reference. Such RFID systems may be used with various embodiments described and/or suggested herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A Radio Frequency Identification (RFID) system, comprising:
a chain of radiating elements;
a transmission line; and
power dividers coupled along the transmission line, the power dividers coupling the transmission line to each of the radiating elements, the power dividers being configured such that each radiating element receives about a same amount of power from the transmission line,
wherein at least one of the radiating elements has two portions coupled together with one or more resistors for introducing losses.

2. The RFID system of claim 1, wherein the radiating elements provide about a uniform electromagnetic field along the chain.

3. The RFID system of claim 1, comprising a feeding port coupled to the transmission line, the feeding port being configured for coupling the system to an RF device.

4. The RFID system of claim 1, wherein a spacing between the radiating elements is close enough so that no gaps in an effective RF field generated thereby is present between adjacent radiating elements.

5. The RFID system of claim 1, wherein a spacing between the radiating elements provides separate, nonoverlapping volumes of space each having about a uniform strength of electromagnetic field.

6. The RFID system of claim 1, wherein lengths of the transmission line between adjacent power dividers exhibit negligible loss of energy.

7. The RFID system of claim 1, wherein the power dividers are configured to compensate for loss of energy in the transmission line.

8. The RFID system of claim 1, wherein the radiating elements are positioned along opposite sides of an axis.

9. The RFID system of claim 1, wherein the radiating elements are all aligned along a single straight line.

10. The RFID system of claim 1, wherein the radiating elements include dipole antennas.

11. The RFID system of claim 1, wherein the radiating elements include helix antennas.

12. The RFID system of claim 1, wherein the radiating elements include patch antennas.

13. The RFID system of claim 1, wherein the radiating elements include linear polarized antennas.

14. The RFID system of claim 1, wherein the radiating elements include circular polarized radiating elements.

15. The RFID system of claim 1, wherein an electric field strength along a plane positioned nine inches above the radiating elements, and between outermost of the radiating elements, has a variation of less than 5 dB.

16. The RFID system of claim 1, comprising a feeding port coupled to the transmission line, and an RFID interrogator coupled to the feeding port.

17. The RFID system of claim 1, wherein a pair of the radiating elements are positioned along opposite sides of an axis, each pair being coupled to an associated power divider.

18. The RFID system of claim 1, wherein the power dividers include 180 degree power dividers.

19. The RFID system of claim 1, wherein the power dividers include energy distribution power dividers.

20. A Radio Frequency Identification (RFID) system, comprising:
    a chain of radiating elements;
    a transmission line; and
    power dividers coupled along the transmission line, the power dividers coupling the transmission line to each of the radiating elements, the power dividers being configured such that each radiating element receives about a same amount of power from the transmission line,
    wherein the radiating elements include linear polarized antennas,
    wherein at least some of the antennas have two portions coupled together with resistors for introducing losses.

21. A Radio Frequency Identification (RFID) system, comprising:
    a chain of radiating elements, each radiating element having multiple portions;
    a transmission line; and
    power dividers coupled along the transmission line, each power divider being associated with at least one radiating element, the power dividers coupling the transmission line to each of the radiating elements, the power dividers being configured such that each radiating element receives about a same amount of power from the transmission line,
    wherein the portions of each of the radiating elements are on a common dielectric substrate,
    wherein each power dividers is on a dielectric substrate that is separate from the dielectric substrate of the associated radiating element.

22. The RFID system of claim 21, wherein the portions of each radiating element overlie a common signal ground layer, wherein the signal ground layer is separate from a signal ground layer of the associated power divider.

23. The RFID system of claim 21, wherein the power dividers include 180 degree power dividers.

24. The RFID system of claim 21, wherein the portions of the radiating elements lie along opposite sides of an imaginary line of symmetry.

25. The RFID system of claim 21, further comprising a plurality of 180 degree power dividers, each 180 degree power divider being interposed between one of the power dividers and the associated radiating element.

* * * * *